(No Model.) 2 Sheets—Sheet 2.
W. J. BREWER.
SUSPENSION CABLE TRACK.
No. 551,525. Patented Dec. 17, 1895.
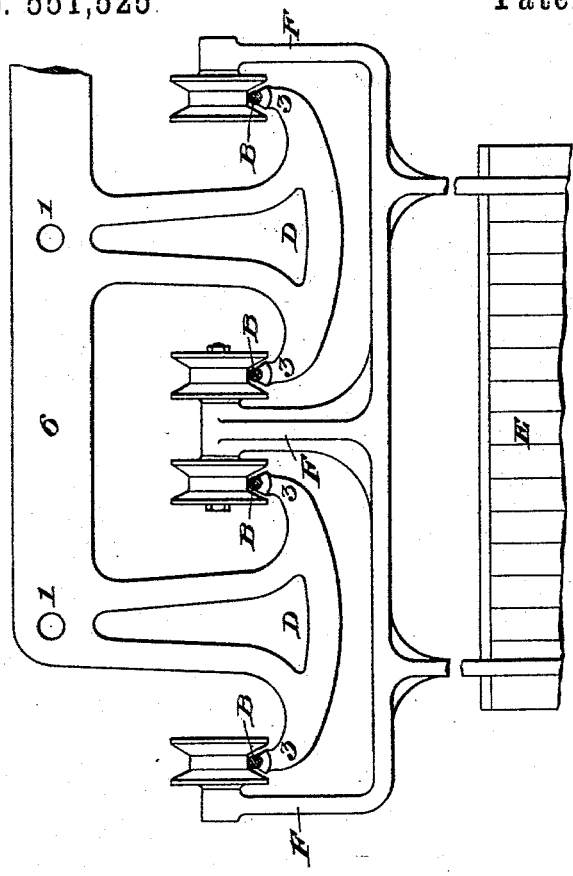
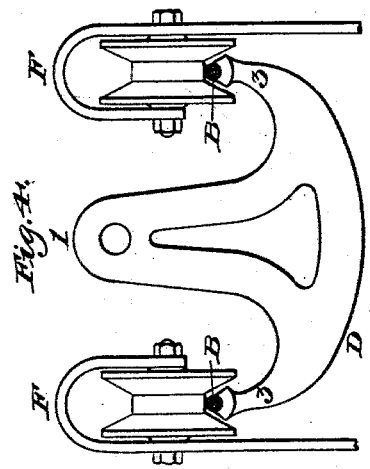
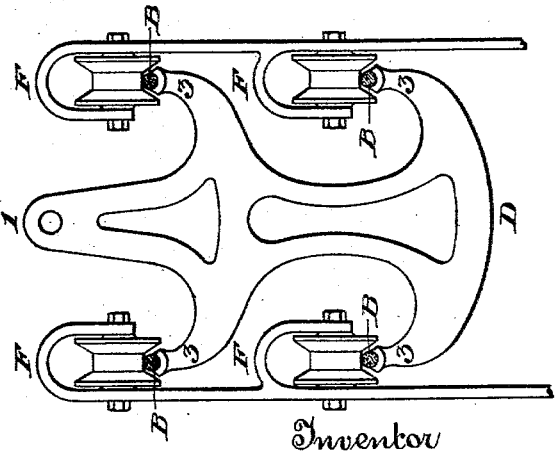
Witnesses
C. W. Smith
Geo. M. Whitney.
Inventor
William John Brewer
by ____ Atty

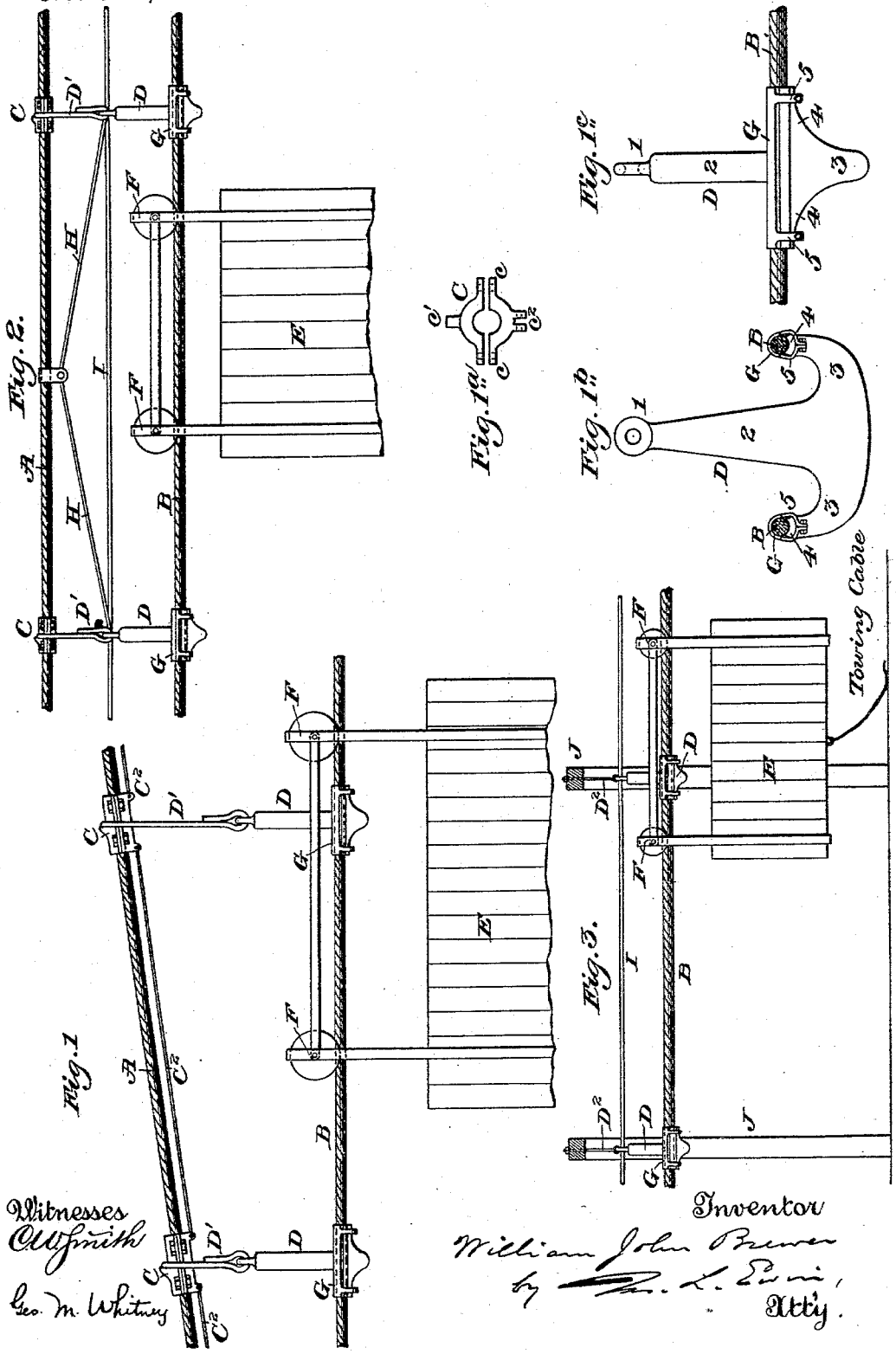

UNITED STATES PATENT OFFICE.

WILLIAM JOHN BREWER, OF LONDON, ENGLAND.

SUSPENSION CABLE TRACK.

SPECIFICATION forming part of Letters Patent No. 551,525, dated December 17, 1895.

Application filed August 13, 1894. Serial No. 520,206. (No model.) Patented in England September 21, 1893, No. 17,786.

*To all whom it may concern:*

Be it known that I, WILLIAM JOHN BREWER, a subject of the Queen of Great Britain, and a resident of London, England, have invented certain new and useful Improvements in and Applicable to Suspension Cable Tracks, (patented to me in Great Britain by Letters Patent No. 17,786, dated the 21st day of September, 1893,) of which the following is a specification.

This invention relates to suspension cable tracks for the conveyance of passengers or freight in carriages or cars operated by haulage means at fixed stations, or it may be by an electric or other motor carried by the carriage or car or connected therewith.

One object of the invention is to construct a suspension cable track in such a manner that the traveling carriers of the carriage or car will have free and uninterrupted passage from end to end of the cables constituting the track, while at the same time these cables are reinforced or strengthened by the supports over the arms of which the track-cables are carried.

Another object of the invention is to distribute the strains as widely as practicable at every suspension-point in a cableway flexible throughout; and a last object is to preclude the escape of the track-cables from their supports at every such suspension-point, especially in a structure of such flexibility.

The primary suspension cable or cables is or are to receive thimbles or tubular pieces, forming part of or connected to depending track-supports comprising laterally-extending arms. These arms are curved upward and outward, and their outer ends are extended lengthwise of the cableway, and together with their extensions are grooved at top to receive the track-cables, which are fastened in place by clips in a peculiar manner, as hereinafter described. This forms a double track, with one cable upon each side of the primary cable or cables.

A modification may be employed in which there will be provided a second and lower set of arms to support other track-cables, thus giving a double or multiple cable track upon each side of the primary cable or cables.

There may be two or more primary cables employed by making the thimbles or tubular pieces with a bore for each through which said cables extend. Thus two primary cables may lie one above the other in the same vertical plane or be disposed horizontally, or three or more primary cables may be employed, in which case an equal number of piercings will be provided. The said tubular pieces will be threaded on the primary cable or cables, and they may be placed so as to abut end to end when very great strength is required, as they will in that case render additional but flexible or yielding support to one another. To insure that these tubular pieces shall not move apart when weight is in suspension, there may be provided a light rope or cable, the ends whereof will have screwed-pins or terminal bolts and adjusting-blocks for tightening purposes, which will, however, in no wise detract from the flexibility or yielding character of the cable system.

To further enhance the carrying power of the primary cable or cables, I provide the thimbles or tubular pieces with eyes or holders on their upper edges or parts to serve as holding means for guy-ropes, rods or chains. Such guys at their outer ends will be carried out to and be secured to any available anchorage.

The carriages or cars for running upon the cable tracks as aforesaid will be hung from traveling carriers having upturned arms, preferably of inverted-U shape, and said arms will carry grooved wheels or runners, the grooves whereof are of abnormal depth to insure a sufficient depth of flange for safety. Double-armed carriers are used in some cases, and the double-U-shaped portions are connected by a central web connecting the outer groove of the upper U with the inner groove of the lower U when double tracks on each side of the suspension system are made use of.

To relieve the track-cables from frictional wear and tear from the contact of the runners of the grip or carriage suspension means, the abnormally-deep grooves of the runners are to be provided with rubber, rope, or other suitable tires, sunk therein.

It is at times desirable to reduce the weight upon the cable system by means of a balloon in combination with other means of support and haulage, and in such case I furnish a combined carrier arrangement of runners upon the track-supports, with supplementary antifriction wheels or rollers to prevent the carriage-support from being lifted away from the cable tracks.

Where the condition of the ground will admit of it, intermediate supports may be provided, consisting of side struts and a crossbeam or top tie-bar, straddling the cables, and suspension means from the beam to the track-supports will be used. At the anchorage ends of the cables I carry the same over grooved arms or eccentrically or centrically mounted disks or drums, or employ other suitable mechanism to insure tightening or taking up the slack in the track-cables. In some cases a guide rope or ropes or a towing-cable may be employed below the carriage, as in Fig. 3.

In order that the said invention may be fully understood, I shall now proceed more particularly to describe the same, and for that purpose shall refer to the several figures on the annexed sheets of drawings, the same reference letters and numbers indicating corresponding parts in all the views.

Figure 1 of the accompanying drawings shows, in side elevation, part of a cable track constructed according to this invention. Figs. 1$^a$ and 1$^b$ are detail views endwise of the cable track, Fig. 1; and Fig. 1$^c$ is an elevation projected from Fig. 1$^b$. Fig. 2 shows a side elevation of another arrangement of cables and accessories. Fig. 3 shows a sectional side elevation of a further arrangement. Fig. 4 represents another depending track-support with two outwardly-extending arms for carrying the track-cables. Fig. 5 shows another form of construction of the depending track-support having two arms on each side. Fig. 6 is a similar view showing a modification of the support arranged for four cable tracks. Fig. 7 shows another alternative form of construction of two-cable supports. Fig. 8 shows part of a track-cable provided with tubular lengths for preventing wear of said cable, and Fig. 8$^\times$ represents a longitudinal section of one of said tubular lengths.

In Figs. 1 and 2, A represents the primary cables; B, the track-cables; C, the thimbles or tubular pieces; D, the depending track-supports, and E cars hung from wheels axled in curved arms F and traveling upon the track-cables. The thimbles C are shown each made in two parts bolted together through flanges $c$, Fig. 1$^a$, and provided with an ear $c'$ on top, together with or without perforated lugs $c^2$, Fig. 1$^a$, at bottom. The thimbles are firmly secured on the primary cable A, and may also be prevented from slipping by being tied together by means of guy-ropes $C^2$ attached to said lugs $c^2$, or by other suitable means.

The track-supports D are suspended from the thimbles by means of hangers D' or it may be in any other suitable manner, and comprise in each, as shown in Figs. 1$^b$ and 1$^c$, a suspension-eye 1 and a main portion or stem 2, the latter having outwardly-extending arms 3 provided with extensions 4 in the direction of the cableway. The tops of these arms and extensions have grooves to receive the track-cables B, and these cables are held in place therein by means of a clip G upon each cable, such clip consisting of a semicircular plate of comparatively thin section which embraces the cable and has depending fingers through the medium of which the cable is secured to said arm extensions, said fingers encircling said arm extensions and being fastened beneath the same by bolts, studs, or other means, as represented at 5 in said Figs. 1$^b$ and 1$^c$.

In Fig. 2 the track-cables B are shown supported in a manner similar to that shown in Fig. 1 as regards the primary cable A, thimbles C, hangers D', and track-supports D; but in case of one of the hangers giving way or breaking an additional safeguard is provided in the form of diagonal ties H which are secured to the primary cables A and supports D. A horizontal rope I connecting the track-supports D at their eyes 1 serves also to prevent displacement of the supports lengthwise of the track.

Fig. 3 shows the track-cables B suspended from wooden framings J by means of hanger-bolts D$^2$ and depending track-supports D. This arrangement is particularly suitable for use in mines and the like.

In the arrangements hereinbefore described the primary cable or cables is or are supported in any suitable manner, and the track-cables may be kept taut by passing over guides or rollers adjustable by hand-wheel, worm-gearing, or the like, in known ways.

The depending track-supports D may have on either side one or more laterally-projecting arms 3, as shown in Figs. 4 and 5, or any number of such supports may be combined in one by a tie-bar 6, as shown in Fig. 6. They may be of steel or other suitable material, and they may be cast, forged or rolled. Instead of an eye or eyes for suspending such supports, as shown at 1 in Figs. 4, 5, and 6, each support may have a boss 7 screw-tapped and provided with an eyebolt 8, or an equivalent adjustable suspending device, as shown in Fig. 7.

To prevent wear of the track-cables B, these may be protected by lengths of tubing K, as shown in Figs. 8 and 8$^\times$, said lengths being formed with male and female end surfaces $k'$ $k^2$, Fig. 8$^\times$, so as to form socket-joints.

Having now particularly described and ascertained the nature of the said invention and in what manner the same is to be performed, I declare that what I claim is—

1. A suspension cable-track comprising primary supporting means, track-supports depending therefrom and provided with laterally projecting arms having extensions lengthwise of the track and grooves in the tops of said extensions, track-cables within said grooves, and clips covering those portions of the cables within the grooves and having fingers encircling said extensions to retain the cables within said grooves, substantially as hereinbefore specified.

2. In a suspension cable-track, the combination of a primary supporting cable or cables, thimbles embracing the same, guys connecting said thimbles with each other, hangers depending from said thimbles, track-supports depending from said hangers and provided with laterally projecting arms on either side, and track-cables supported upon said arms, substantially as hereinbefore specified.

3. In a suspension cable-track, the combination with track-cables of track-supports provided with laterally projecting arms having extensions lengthwise of the track and cable-receiving grooves in the tops of said extensions, and clips covering those portions of the cables within said grooves and having fingers encircling said extensions to retain the cables within said grooves, substantially as hereinbefore specified.

WILLIAM JOHN BREWER.

Witnesses:
M. NOTT,
K. LESSNER.